Sept. 25, 1962   GORDON P. K. CHU ETAL   3,055,779
METHOD OF MAKING ENAMELED DUCTILE IRON
Filed March 16, 1959   2 Sheets-Sheet 1

INVENTORS
GORDON P.K. CHU
BY  WERNER C. HELWIG

ATTORNEY

Sept. 25, 1962    GORDON P. K. CHU ETAL    3,055,779
METHOD OF MAKING ENAMELED DUCTILE IRON
Filed March 16, 1959                    2 Sheets-Sheet 2

INVENTORS
GORDON P.K. CHU
WERNER C. HELWIG
BY
ATTORNEY

United States Patent Office

3,055,779
Patented Sept. 25, 1962

3,055,779
METHOD OF MAKING ENAMELED
DUCTILE IRON
Gordon P. K. Chu, Spencerport, and Werner C. Helwig, Rochester, N.Y., assignors to Pfaudler Permutit, Inc., Rochester, N.Y., a corporation of New York
Filed Mar. 16, 1959, Ser. No. 799,757
3 Claims. (Cl. 148—139)

This invention relates to vitreous enameled equipment and more specifically to vitreous enameled, ductile cast iron equipment and a method for making the same, one object of this invention being the provision of a practical and economical article of the above description.

Vitreous enamel or glass coated equipment made of gray cast iron or mild steel has long been used for many purposes where the smooth, corrosion-resistant glossy surface of such coatings was desirable. The demand for such equipment is particularly high in the chemical and process industries where vitreous enamel or glass coated equipment has been used for vessels, reactors, tanks and numerous other types of equipment. This equipment has generally been fabricated partially from gray cast iron and, to a greater extent, from mild steel and subsequently glassed to provide the desired smooth, glossy corrosion-resistant coating. Such equipment must be of the highest quality completely free of cracks, pinholes, blisters and other imperfections or discontinuities which could form starting points for corrosive failure.

The use of these items of major chemical process equipment described above has also resulted in a demand for glass or vitreous enamel coated accessories and fittings to be used in connection therewith, in order to provide such fittings having corrosion-resistant and other characteristics equivalent to those of the main pieces of apparatus. Such auxiliary equipment, such as valves, pumps, connectors, pipes, agitators and other items of like nature, are usually smaller in size and more complex in shape than the large vessels or other pieces of major equipment with which they are used. For this reason, the components of such equipment, such as valve bodies, pump impellers, casings and other components of intricate shape, have generally been fabricated by casting. Ordinary gray cast iron has generally been used, since this is the most economical material for the fabrication of the complex shapes involved. These cast iron components are then machined where necessary, and after suitable preparation, are given one or more coats of vitreous enamel in order to present the desired smooth corrosion-resistant surface to the material being handled by the equipment.

It was found in practice, however, that as process requirements became more demanding, and higher temperatures and pressures were used, that the mechanical limitations inherent in ordinary gray cast iron began to be the chief limiting factor in the use of such vitreous enamel coated cast iron components. In the case of pressure resisting parts, the tensile strength, yield strength, modulus of elasticity, dimensional growth at elevated temperatures and other similar properties present limitations which prevent the use of gray cast iron components in process service where high temperature or high pressure conditions are encountered. For moving parts, such as pump impellers, agitators, and the like, the above properties, plus the lack of ductility, brittleness, and other undesirable properties of gray cast iron greatly limited the use of this material for severe or critical applications in chemical and allied process industries. For this reason, there has been considerable interest shown in recent years in the use of fabricated steel and machined steel and alloy castings for use in this type of service.

It was found that these limitations could be overcome by the use of either machined steel or cast, high strength alloys for use as a base metal in fabricating enameled parts for the exacting services described above. However, the cost factor involved in using these parts has heretofore proven to be a substantial bar to the use of such machined steel or alloy components for the production of vitreous enamel or glass-coated components for process industries. For this reason, the provision of a relatively inexpensive base metal, having the requisite mechanical properties to make it suitable for use in exacting services in the process industries is another object of this invention.

Ductile or nodular cast iron has recently been introduced as a general purpose material which may be produced in the usual iron casting equipment, but which has mechanical properties greatly superior to those of ordinary white or gray cast iron. The principal advantages of this material are well known to the trade, and may be summarized as higher tensile and yield strengths, greatly improved ductility, substantially reduced dimensional growth at elevated temperatures, improved sealing resistance in oxidizing atmospheres at elevated temperatures, and a greatly improved modulus of elasticity. This material, in fact, rivals the properties of machined steel for many applications. It is superior to cast steel in machinability, castability and surface finish; at the same time, this material is much cheaper than cast steel. Its cost is approximately the same as that of ordinary white or gray cast iron.

While the use of ductile or nodular cast iron would therefore be the logical material to replace gray cast iron or cast steel for the production of parts and components designed for use in enameled process equipment, it has heretofore been found impossible to apply a satisfactory coat of vitreous enamel or glass thereto. Although this material has been on the market for more than ten years, enameled ductile iron has not been available in the market up to the present time. Whenever the glass coating of such nodular iron castings was attempted, the resulting enamel contained an undue quantity of bubbles, blisters, pinholes and other imperfections which are intolerable in components which are exposed to corrosive environments in chemical process equipment. For this reason, the main object of this invention has been to overcome this difficulty in order to permit the vitreous enamel coating of ductile castings for use in the chemical and other process industries.

The majority of the imperfections in the glass or vitreous enamel coatings applied to ductile or nodular cast iron are caused by the evolution of carbon oxide gases from the carbon in the surface of the iron during the glassing operation. These carbon oxide gases, both carbon monoxide and carbon dioxide, form bubbles in the viscous enamel during the firing stage, and these bubbles are trapped when the enamel hardens on cooling, forming the imperfections described above. Some of the bubbles are able to migrate to the surface while the enamel is still viscous, and upon bursting leave appreciable pinholes, which form a starting point for corrosive attack which ultimately results in a failure of the coating. For this reason, the elimination of the carbon oxide gases originating at the surface of the metal during the enameling step is another object of this invention.

Other objects of the invention include the provision of a method of treating ductile cast iron objects for subsequent enameling which is simple, relatively inexpensive, and which allows the production of parts having continuous blemish-free vitreous enamel surfaces.

Other objects of this invention will be particularly set forth in the claims and will be apparent from the following description, when taken in connection with the accompanying drawings, in which:

Figure 1:
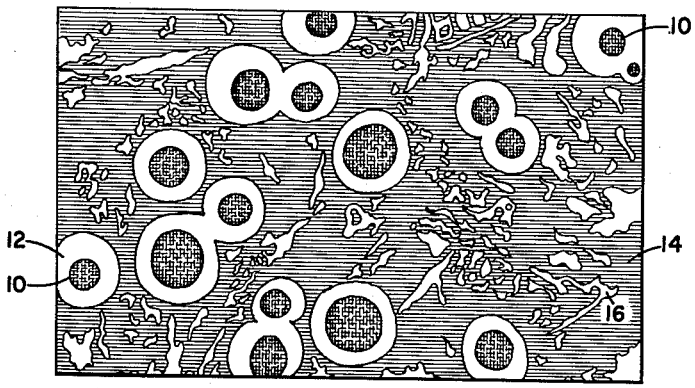
FIG. 1 is a drawing of an etched photomicrograph, enlarged approximately 250 diameters, of a polished sample of ductile nodular iron in the "as cast" condition as received from the foundry.

Referring now to the figures, FIG. 1 is a drawing, enlarged about 250 diameters, of a section of commercial nodular ductile cast iron in the "as cast" condition as received from the foundry. This iron is known to the trade as "60–45–15"; that is, it has a tensile strength of 60,000 pounds per square inch, a yield strength of 45,000 pounds, and minimum ultimate elongation of 15 percent. It is an excellent material for use in the construction of process equipment of all types; it conforms to A.S.T.M. specifications A395–56T for "Pressure Containing Parts for Use at Elevated Temperatures," and has been recommended by the American Petroleum Institute for use in petroleum refinery equipment. The average composition of a typical specimen of such iron is as follows:

| | Percent |
|---|---|
| Total carbon | 3.4 to 3.7 |
| Silicon | 2.3 to 3.0 |
| Manganese | .25 to .35 |
| Sulphur | [1] 0.02 |
| Phosphorous | [1] 0.08 |
| Magnesium | 0.04 to 0.08 |
| Iron | Balance |

[1] Maximum.

This iron contains a plurality of small globular particles or nodules of carbon 10 in the form of spheroidal graphite, each surrounded by an area of ferrite 12. This ferrite is substantially pure iron. The material 14 surrounding the ferrite globules containing the graphite is essentially pearlite which, as is well known in the metallurgical art, consists of a laminar structure of alternating layers of iron carbide and pure iron or ferrite. Interspersed throughout this matrix of pearlite are long needle-like crystals 16 of acicular iron carbide. Thus it may be seen that the carbon in this sample of ductile nodular iron in the state in which it is received from the foundry exists in two separate forms. Part of it is in the form of uncombined or elementary carbon in the form of graphite nodules 12, while the bulk of it consists of iron carbide either in the form of pearlite 14 or the form of acicular iron carbides 16 interspersed throughout the entire structure of the iron.

Figure 2:
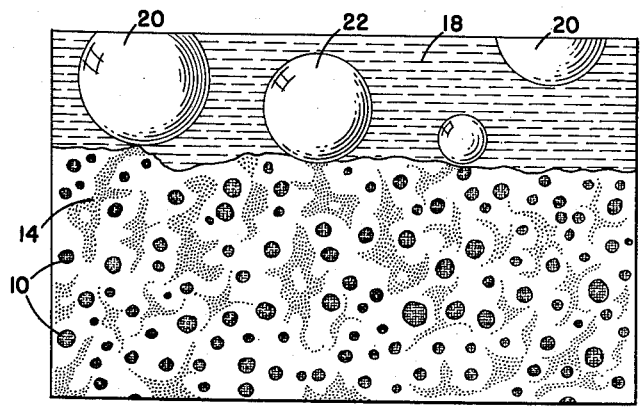
FIG. 2 is a drawing of an etched photomicrograph, enlarged approximately 100 diameters, of a cross-section of a sample of untreated nodular iron coated with vitreous enamel taken at right angles to the surface.

This unique structure accounts for many of the special properties of nodular iron, and at the same time, is at the root of the difficulties that have heretofore been encountered in applying glass or vitreous enamel coatings thereto. In the first place, the presence of a large amount of carbon, both in the combined state as pearlite and iron carbide and in the free state as graphite in the region near the surface of the iron, causes serious blistering and pinholes in the enamel, thereby destroying its value as a corrosion-resistant protective coating. It is known that these blisters or pinholes in the enamel are caused by the reaction of the carbon in and adjacent to the surface of the iron with oxygen or moisture in the firing atmosphere and with the oxygen contained in the enamel composition in the form of water or in other forms, to form gaseous oxides of carbon. As these carbonaceous gases are formed at the surface of the iron, and at the interfacial areas of the glass and the metal, they are prevented from escaping into the atmosphere by the coating of viscous, impervious enamel covering the surface of the iron. Under these conditions, the carbon monoxide or dioxide gases form bubbles in the enamel, either forcing the enamel away from the surface of the iron to form a pit, or, if they are of sufficient size, and the viscosity of the enamel is sufficiently low, such bubbles will leave the surface of the iron and are entrapped in the enamel in the form of bubbles. This phenomenon of the formation of bubbles on the surface of the iron is clearly shown in FIG. 2. In this figure, the nodules of free carbon in the iron are shown at 10, while the combined carbon in the form of pearlite is shown at 14. The matrix of enamel covering the iron is shown at 18. As can be seen, this enamel coating contains a number of small free floating bubbles shown at 20. In addition, a large bubble 22 has formed at the surface of the iron, and has completely forced the enamel away from the iron leaving a large fault or flaw in the enamel at this particular location.

This oxidation effect which causes carbon in the surface of the metal to form carbon monoxide or carbon dioxide that cause blisters in the enamel cannot be completely prevented by firing the enamel in a protective oxygen free atmosphere. The reason for this is the fact that some oxygen is always present in the cast iron in the form of iron oxides which will be available for the oxidation of iron carbide or graphite existing at the surface of the metal, at enamel firing temperatures, to form the objectionable carbon oxide gases. Further, the enamel composition itself contains oxygen or hydroxyl ions in the form of combined water and these small amounts of oxygen are sufficient to cause deleterious effects described above. For this reason, it has been found not entirely effective to fire the enamel under protective atmosphere, and that substantial complete removal of carbon and carbides from the surface of the ductile iron article to be coated, and a stabilization of carbon in the body of the material in a form sufficiently stable to limit or prevent the migration of carbon to the surface at enamel firing temperatures, are necessary to completely prevent the formation of the deleterious carbon oxide gases.

While there may be several ways of accomplishing this end, the most practical and economical has proven to be the pre-treatment of the iron prior to the enameling to remove the carbon existing in the iron adjacent to and for a considerable depth beneath the surface and to convert the carbon in the body of the iron to a stable form. Further, the unique structure of nodular iron has made it possible to approach this problem in the novel manner which is hereinafter described.

Figure 6:
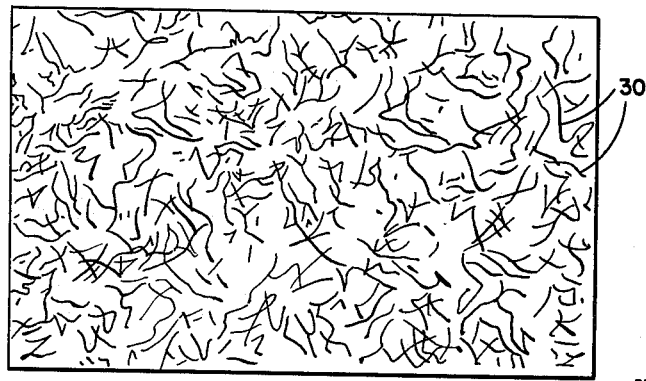
FIG. 6 is a drawing of an etched photomicrograph, enlarged approximately 100 diameters, of a polished sample of gray cast iron.

Referring again to FIG. 1, it will be observed that the nodular iron structure in the "as cast" condition consists mainly of graphite nodules surrounded by ferrite, with a relatively large amount of pearlite forming the matrix. It will be noted that the combined carbon exists in relatively small quantities and in relatively short crystals. This particular structure has results in several properties of the iron. In the first place, nodular iron is comparatively resistant to oxidation from atmospheric oxygen at elevated temperatures. This is chiefly due to the fact that the spheriods of graphite do not extend continuously into the iron matrix as in gray cast iron (FIG. 6) where the graphite flakes 30 form a substantially continuous network leading down into the interior of the body of iron. Thus, in contrast with gray cast iron, oxygen from the atmosphere cannot penetrate into the surface of nodular iron at elevated temperatures by oxidizing the carbon and traveling down the same below the surface of the iron. Thus, nodular iron may be held at elevated temperatures in oxidizing atmospheres for considerable lengths of time before any serious oxidation of the iron itself occurs. In the second place, the carbon in ductile iron has a tendency to gather in nodules rather than to disperse evenly throughout the matrix when liberated from combination with iron. Thus, when the iron is maintained at a temperature which is unfavorable to the solution of carbon and iron, the carbon will tend to precipitate out on the surfaces, the already existent nodules of graphite rather than to precipitate out in smaller crystals evenly dispersed throughout the body of the iron as in the case of ordinary cast iron.

These general principles relating to the structure and behavior of nodular iron at various temperatures have been utilized the same in the present invention to minimize the evolution of carbon containing gases at the surface of the metal during the firing of vitreous enamel coatings, thereby making possible, for the first time, the commercially practical manufacture of vitreous enamel coated nodular iron articles having the advantages set forth above.

The novel treatment designed to prevent the formation of carbon oxide gases at the surfaces of the nodular iron during the firing of vitreous enamel coatings consists of two distinct steps. The first step consists of the heat treatment for removing the carbon from the regions at and near the surface of the nodular iron itself. While this may be described as a decarburizing process, it differs materially from the decarburization processes heretofore used and known, due to the peculiar structures of nodular iron itself described above. This decarburizing step comprises subjecting the iron to an elevated temperature, in an oxidizing atmosphere, preferably between 1550 and 1850 degrees Fahrenheit for a period generally ranging between one and six hours, depending on the composition and thickness of the casting, and the quality of the results desired.

The temperature range is relatively critical; temperatures lower than 1550 degrees Fahrenheit do not efficiently decompose iron carbide and therefore do not cause the decarburization to occur as efficiently as desired, while temperatures above 1850 degrees Fahrenheit have been found to adversely affect the mechanical properties of the finished nodular iron casting. Above 1850 degrees, the castings tend to warp and the tensile strength of the finished part tends to decrease. We have therefore arbitrarily set the upper limit for practical operation at 1850 degrees Fahrenheit, but it is to be understood that if the mechanical properties of the casting are not too critical, or if a certain degree of warpage and growth can be tolerated, this process can be carried out to advantage at temperatures considerably higher than 1850 degrees Fahrenheit.

In addition, the time at which the casting is held at the decarburizing temperature is also important. The object is to remove the carbon and carbides by decomposition, diffusion and oxidation not only from the surface, but from a layer of considerable thickness (approximately 1–20 mils) so that the carbon cannot diffuse outwardly to cause the formation of carbonaceous gases during the period of firing of the enamel. About the minimum practical time for this heat treatment for thin pieces has been one hour, and it has generally been found that six hours will be sufficient to allow the application of a good coherent impervious coat of enamel for even the thickest pieces; a rule of thumb of two to four hours for the first two inches of thickness plus an additional hour for each additional inch of metal is a good guide for this process. However, it has been found that treatments of considerably longer time have no deleterious effects and may be employed for advantage in the production of particularly high grades of enameled objects where cost and other factors are not as important as overall quality of the finished part. Naturally, shorter treating time may be used where the quality of the enamel is less critical.

The atmosphere existing in the furnace during this decarburizing treatment is also important and differs from the ordinary practice heretofore used in the decarburizing art. As stated above, the decarburizing is carried out in an oxidizing atmosphere. This is contrary to prior practice, and particularly to the practice usually followed with cast iron which is relatively sensitive to oxidation when at elevated temperatures. The oxidizing atmospheres recommended are either air, so-called "exothermic gas" which consists of burned natural gas, or wet hydrogen containing an appreciable amount of water for the liberation of oxygen. The use of such oxidizing atmospheres for this process is made possible by the structure of nodular iron particularly the shape of the spheroidal graphite as contrasted to the relatively long flakes of graphite in ordinary gray cast irons as described above. This oxidizing atmosphere causes an oxidation of all carbon diffusing to the surface of the iron and the removal of the same as carbon monoxide or dioxide as the temperature and equilibrium conditions with the atmosphere of the furnace dictate; however, the object of the treatment is the complete removal of carbon for a considerable depth beneath the surface of the iron.

Figure 3:
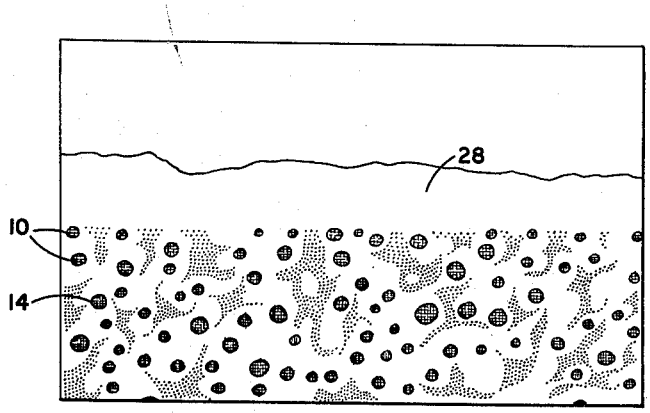
FIG. 3 is a drawing of an etched photomicrograph, enlarged approximately 100 diameters, of a cross-section of ductile nodular iron taken at right angles to the surface after being subjected to the first step of the treatment embodying this invention.

FIG. 3 clearly illustrates the effects of this preliminary decarburization treatment of the iron. FIG. 3 is a drawing of a section enlarged to approximately 100 diameters, of material shown in the untreated state in FIG. 2. Upon examination of the figure, it is clear that the structure of the surface has changed and that substantially all of the elementary and combined carbon in the surface layer 28 has been eliminated. The basic structure of the nodular iron, that is, the globules of uncombined graphitic carbon 10 surrounded by relatively pure iron embedded in a matrix of pearlite 14 comprising the body of the casting remains essentially unchanged. However, the surface layer 28 of the iron is substantially free of carbon in both the elementary and combined states.

The second step in this process comprises the gradual reduction of the temperature of the iron to approximately 1275 to 1350 degrees Fahrenheit in a period of from two to six hours, and holding the casting at this temperature in the same oxidizing atmosphere for from two to eight hours depending on the mass and composition. The purpose of this step is to cause the dissolved carbon to separate and precipitate out of the solution as free carbon or graphite, and to deposit on the surface of the nodules already existing in the iron and below the decarburized surface. The temperature range for this second step is also relatively critical; the temperatures of 1275 to 1350 degrees Fahrenheit being chosen because this is the lowest practical temperature range at which ductile iron can be held for the precipitation of graphite at any appreciable rate. As the graphitization process proceeds, the existing nodules of graphite in the iron become larger, and the pearlite existing in the iron matrix surrounding the nodules gradually disappears. When the second step is carried to completion, the structure of the matrix of iron is almost wholly ferritic combined with large nodules of graphite. Since the second step is also carried out in an oxidizing atmosphere, any carbon diffusing to the surface during this step is immediately removed by oxidation to carbon monoxide or carbon dioxide, and thus the surface is kept essentially free of free and combined carbon during this step.

Figure 4:
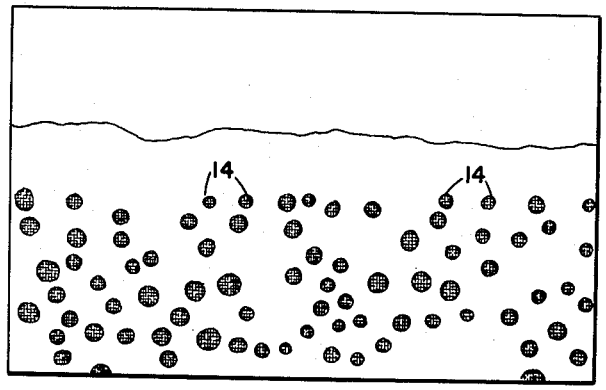
FIG. 4 is a drawing of an etched photomicrograph, enlarged approximately 100 diameters, of a cross-section of ductile nodular iron taken at right angles to the surface after being subjected to the second step of the treatment embodying this invention.

FIG. 4 clearly shows the result of the second step in the treatment embodying the present invention. Not only is the surface layer 28 substantially free of carbon in both the elementary and combined states but the structure of the body of the iron has been completely altered.

An examination of FIG. 4 will show the absence of any substantial quantity of pearlite and carbide grains and instead shows a matrix of almost pure ferrite containing enlarged nodules of ghaphite 14 in the elementary or uncombined state. In other words, the surface of the iron has been rendered substantially free of carbon in both combined and uncombined forms while the carbon in the body of the iron has been converted to the stable form of graphite and the relatively unstable iron carbide has been eliminated completely.

After the surface of the iron has been decarburized, and the carbon existing in the body of the metal has been substantially completely converted to the relatively stable form of graphite nodules, it is possible to coat the iron with glass or vitreous enamel and to fire the same. The carbon in the form of graphite nodules is relatively stable and is affected only to a minor degree by the temperatures required for firing vitreous enamel or glass. However, if the carbon below the surface were allowed to remain in the relatively unstable form of iron carbide, either as massive grains of iron carbide or in the laminar form as pearlite, the firing of the enamel would be difficult. The reason for this is that carbon in the combined form is relatively unstable and will tend to migrate through the iron at the elevated temperatures required for firing the enamel. This migration will naturally occur in all directions, under the laws of equilibrium, and the diffusion will naturally occur to the greatest extent into the zone which has been rendered free of carbon by the decarburization carried out in step 1 of this process. This breakdown of the unstable iron carbide and the diffusion of the carbon into the decarburized layer will bring a certain amount of the carbon to the surface of the iron, and this carbon will then immediately be combined with oxygen to form carbon monoxide or carbon dioxide as the case may be. This carbon monoxide or carbon dioxide will form blisters and bubbles in the glass and at the junction between the iron and the enamel, causing imperfections in the enamel coating. However, this effect will not occur at enamel firing temperatures if substantially all of the carbon remaining in the body of the metal has been immobilized in the relatively stable form of graphitic nodules as shown in FIG. 4.

After the above treatment, the iron is ready for glassing. Generally the surfaces to be coated are first prepared by cleaning to remove oxide, scale, and other foreign matter which might interfere with the adhesion or quality of the glass coating. The standard practice in most enameling plants is to grind or sandblast the surfaces to be coated in order to provide a clean, slightly rough surface to facilitate the adherence of the glass. However, in the case of castings treated by the process embodying this invention, it is necessary to avoid any appreciable removal of material from the surface of the casting in order to preserve the critically important decarburized layer. Should this layer be removed, the beneficial effect of the treatment is nullified, and the enamel coating applied to the areas where the decarburized surface layer has been removed will show blisters, pinholes and other defects of a like nature. For this reason, it is important that castings of nodular iron treated by the process herein described should receive a minimum of disturbance after the specified treatment. A light sandblast, barely sufficient to remove scale and other foreign matter, is recommended, and if this process is carried out with care, no deleterious effects will result.

After the nodular iron casting has been prepared for enameling as described above, it may be coated with glass or vitreous enamel by any of the known processes. Enamels, after having been applied by any one of the known processes, may then be fired in the usual manner. However, firing entails raising the entire casting to an elevated temperature, and as the temperature grows higher, the graphitic nodules in the body of the casting will tend to go partly into solution in the iron and will tend to migrate in all directions. Since the surface layer of the iron has been rendered substantially free of carbon because of the treatment described above, the carbon going into solution in the body of the casting will normally tend to migrate to the surface in order to bring the carbon content of all parts of the casting into equilibrium. For this reason, it is best to select a glass for enameling castings treated by this process that may be fired at relatively low temperatures, that is, not higher than 1500 degrees Fahrenheit.

While any suitable glass composition may be used, one composition that has been found suitable for this purpose is as follows:

| | Percent by weight |
|---|---|
| $SiO_2$ | 54 |
| $Na_2O$ | 14 |
| $K_2O$ | 7 |
| $Al_2O_3$ | 5 |
| $B_2O_3$ | 15.5 |
| $CaF_2$ | 3.0 |
| CoO | 0.5 |
| $MnO_2$ | 0.5 |
| NiO | 0.5 |

Thin composition forms a strong, adherent corrosion-resistant coating that has been found suitable for the protection of apparatus and equipment used in the chemical and other process industries. However, it is to be understood that the glass composition given above is exemplary only, since the treatment embodying the present invention will allow any of the known glasses or vitreous enamels to be applied to ductile nodular iron. Even glasses having firing temperatures higher than 1500 degrees Fahrenheit may be used, but are not recommended for work of the highest quality, and particularly for objects which are to receive several coats of enamel.

Figure 5:
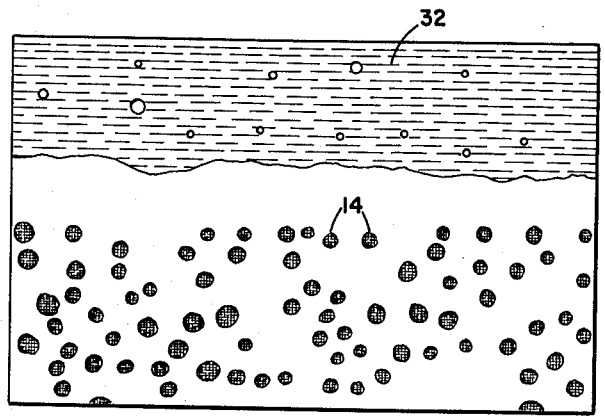
FIG. 5 is a drawing of an etched photomicrograph, enlarged approximately 100 diameters, of a cross-section of a sample of nodular iron which has been treated according to this invention and coated with vitreous enamel, taken at right angles to the surface.

The examination of FIG. 5 clearly demonstrates the practical value of this process in actual use. This figure is a drawing taken from a photomicrograph of a sample of ductile cast iron enlarged approximately 100 diameters and having a coat of glass or vitreous enamel 32 on the surface thereof. It will be observed that, in contrast to FIG. 2, that the vitreous enamel 32 on the surface of the iron is substantially free from large bubbles, blisters, voids or other defects in the glass as well as the glass-metal interface. It has been found, in fact, that through the use of the process herein described, high grade glass coated ductile cast iron parts resistant to acids could be manufactured under actual production conditions in quantities sufficient for commercial use. This has rendered possible the production of reliable components of this nature at a reasonable cost, which for the first time has made the use of glass-coated castings feasible for process equipment on a commercial scale. Such items as valve bodies, pump casings and impellers, flanges, and other items of a critical nature may now be fabricated from ductile nodular cast iron having ample strength and shock resistance to resist the mechanical stresses encountered, and having a good, blemish-free corrosion-resistant coating of glass or vitreous enamel which renders the part substantially immune to corrosive chemical attack.

While the first step in this process has been described as decarburization in an oxidizing atmosphere, it is to be understood that this step could be carried out under a conventional protective atmosphere, if desired. However, neutral or reducing atmospheres are not as efficient in effecting complete removal of carbon and carbides as oxidizing atmospheres; this treatment would therefore have to be prolonged to attain the desired effect. Further, hydrogen rich protective atmospheres may leave appreciable quantities of this element in the body of the metal in nacent or monatomic form. As is well known in the enameling art, this monatomic hydrogen tends to diffuse to the surface of the metal, where it combines to form diatomic hydrogen gas at the glass-metal interface. This gas cannot escape through the coating and therefore exerts an outward pressure against the glass. This may result in the blistering or scaling of the coating known as "fish scaling" in the art. Finally, protective atmospheres are expensive and require elaborate equipment to maintain. For all these reasons, it is preferable to treat the iron in an oxidizing atmosphere although it is to be understood that this step could also be carried on under the conventional protective atmospheres.

We are aware that the industry has long been able to supply so-called "ferritic" grades of ductile cast iron. However, such commercial grades of "ferritic" nodular iron still contain a considerable amount of the carbon in the form of pearlite or iron carbide crystals. In order to be effective for the purpose of preventing any migration of carbon to the surface at enamel firing temperatures as described above, it is necessary that substantially all of the carbon be in the form of graphite nodules; that the percentage of pearlite or other forms of combined carbon in the body of the metal be reduced to a minimum; and that the surface layer be substantially free of carbon in any form. As a practical matter it has been found that the percentage of carbon in combined form in the body of the metal should be less than 0.15%. However, it is to be understood that this limit is arbitrary and no abrupt change in enameling properties occurs when this limit is exceeded. If the decarburized surface layer is particularly thick, more combined carbon can be tolerated in the core; conversely a thin decarburized surface layer requires a more completely treated core. It is this substantial removal of combined carbon from the body of the metal that the second step of this invention accomplishes, and it is this step in combination with the surface decarburization accomplished in the first step that makes the production of high grade glass or enamel coated iron articles possible.

It will thus be seen that this invention accomplishes its stated objects. This invention has provided a means for overcoming the difficulties heretofore encountered in applying adherent blemish-free coats of glass or vitreous enamel on the surface of ductile or nodular iron castings. The process constituting this invention is simple, economical, and may be carried out by standard heat treating equipment. It is adapted for the production of nodular iron casting suitable for coating with vitreous enamel or glass in production quantities. This has resulted in the commercial availability of high grade nodular iron components having the desirable mechanical properites of nodular iron and the desirable chemical corrosion-resistant properties of glass.

While we have described the preferred methods of our invention, it will be apparent that various changes and modifications may be made therein and certain steps thereof may be performed with advantage without employing the complete method and without departing from the spirit of the invention as set forth in the appended claims.

We claim:
1. The method of producing ductile cast iron articles having a vitreous enamel coating, comprising the method steps of heating said iron articles in a decarburizing atmosphere for removing the carbon from the surface layer thereof, maintaining said article at a temperature sufficiently elevated to decompose the carbon compounds in the body of said articles for stabilizing the carbon in the form of graphitic nodules, cooling said article, applying a coating of enamel frit to said article, and heating said article for fusing said enamel on the surface thereof.

2. The method as claimed in claim 1 wherein said decarburizing and decomposition steps are carried out in an oxidizing atmosphere.

3. The method as claimed in claim 1 wherein said decarburizing step is carried out at a temperature of from 1550 to 1850 degrees Fahrenheit for a period of from one to six hours; and wherein said stabilization step is carried out at a temperature of from 1275 to 1350 degrees Fahrenheit for a period of from two to eight hours.

References Cited in the file of this patent

UNITED STATES PATENTS

| | | |
|---|---|---|
| 719,117 | Hunter | Jan. 27, 1903 |
| 2,260,249 | Harder | Oct. 21, 1941 |
| 2,435,946 | Evans et al. | Feb. 10, 1948 |
| 2,455,331 | Eckel et al. | Nov. 30, 1948 |
| 2,835,619 | Millis et al. | May 20, 1958 |

FOREIGN PATENTS

| | | |
|---|---|---|
| 15,225 | Great Britain | of 1894 |

OTHER REFERENCES

Transactions of American Society for Metals, vol. 44, 1952, pp. 310–319.

American Malleable Iron, Malleable Founders' Society, Cleveland, 1944, p. 192.

The Making, Shaping, and Treating of Steel, by United States Steel, 7th edition, p. 383.